US008606772B1

(12) United States Patent
Xu et al.

(10) Patent No.: US 8,606,772 B1
(45) Date of Patent: Dec. 10, 2013

(54) EFFICIENT MULTIPLE-KEYWORD MATCH TECHNIQUE WITH LARGE DICTIONARIES

(75) Inventors: Qiuer Xu, Jiangsu (CN); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 169 days.

(21) Appl. No.: 13/014,315

(22) Filed: Jan. 26, 2011

(51) Int. Cl.
*G06F 17/30* (2006.01)

(52) U.S. Cl.
USPC .......................................................... 707/715

(58) Field of Classification Search
USPC ................................................ 707/741, 715
See application file for complete search history.

(56) References Cited

U.S. PATENT DOCUMENTS

| | | | |
|---|---|---|---|
| 6,493,709 | B1 | 12/2002 | Aiken |
| 7,031,972 | B2 | 4/2006 | Ren et al. |
| 7,516,130 | B2 | 4/2009 | Ren et al. |
| 2006/0253439 | A1 | 11/2006 | Ren et al. |

OTHER PUBLICATIONS

R. Nigel Horspool "Practical Fast Searching in Spring", 1980, pp. 501-506, vol. 10, Sofware-Practice and Experience, School of Computer Science—McGill University, Quebec, Canada.
Juha Karkkainer and Peter Sanders "Simple Linear Work Suffix Array Construction", 2003, pp. 943-955, Max-Planck-Institut fur Informatik, Saarbrucken, Germany.
Muhammad Sharif, et al. "Multiple Values Search Algorithm", 2007-Spring 2008, pp. 49-58, vol. 1, No. 2, Journal of Information & Communication Technology.
Chakrabarti, et al. "Scalable feature selection, classification and signature generation for organizing large text databases into hierachical taxonomies", 1998, pp. 163-178, vol. 7, No. 3, VLDB Journal.
Anagnostopoulos, A. et al. "Sampling Search-Engine Results", May 10-14, 2005, pp. 245-256, Proceedings of the 14th International Conference on World Wide Web, WWW 2005, Chiba, Japan.
Chen J., et al. "Knowledge Discovery and Data Mining Based on Power Plant Real-Time Database: A Survey", Oct. 8-12, 2001, pp. 1-5, Proceedings of International Conference on Power Engineering, Xi'an, China.
Chen L., et al. "Template Detection for Large Scale Search Engines", SAC '06, Apr. 23-27, 2006, 5 pages, Dijon, France.
Hamilton N. "The Mechanics of a Deep Net Metasearch Engine", 2003, 2 pages, Proceedings of the 12th International World Wide Web Conference.
Jessop M., et al. "Pattern Matching Against Distributed Datasets", 2004, 6 pages, Dept. of Computer Science, University of York, UK.
Lai W.C., et al. "An Anatomy of a Large-Scale Image Search Engine", Dec. 2002, 4 pages, Morpho Software Inc., Santa Barbara, CA.
Lavrenko V., et al. "Relevance Models for Topic Detection and Tracking", 2002, 6 pages, Dept. of Computer Science, University of Massachusetts, MA.
Pallickara, S. et al. "Incorporating an XML Matching Engine in Distributed Brokering Systems", 2003, pp. 1-7, Proceedings of the International Conference on Parallel and Distributed Processing Techniques and Applications (PDPTA '03).

*Primary Examiner* — Huawen Peng
(74) *Attorney, Agent, or Firm* — Okamoto & Benedicto LLP

(57) ABSTRACT

One embodiment relates to a computer-implemented method for multiple-keyword matching performed using a computer including at least a processor, data storage, and computer-readable instructions. A keyword set and a text string to be searched are obtained. A suffix sorting procedure is applied to the text string to create a suffix index array. A dual binary keyword search procedure is applied to a reference list of suffix strings presented by the suffix index array. The dual binary keyword search procedure may apply a recursive function that utilizes a divide-and-conquer process and may have inputs of a results list, the suffix index array, and the keyword set. The recursive function may add a range of items to the results list if a keyword is determined to be a prefix of a suffix string in the reference list. Other embodiments, aspects, and features are also disclosed.

12 Claims, 2 Drawing Sheets

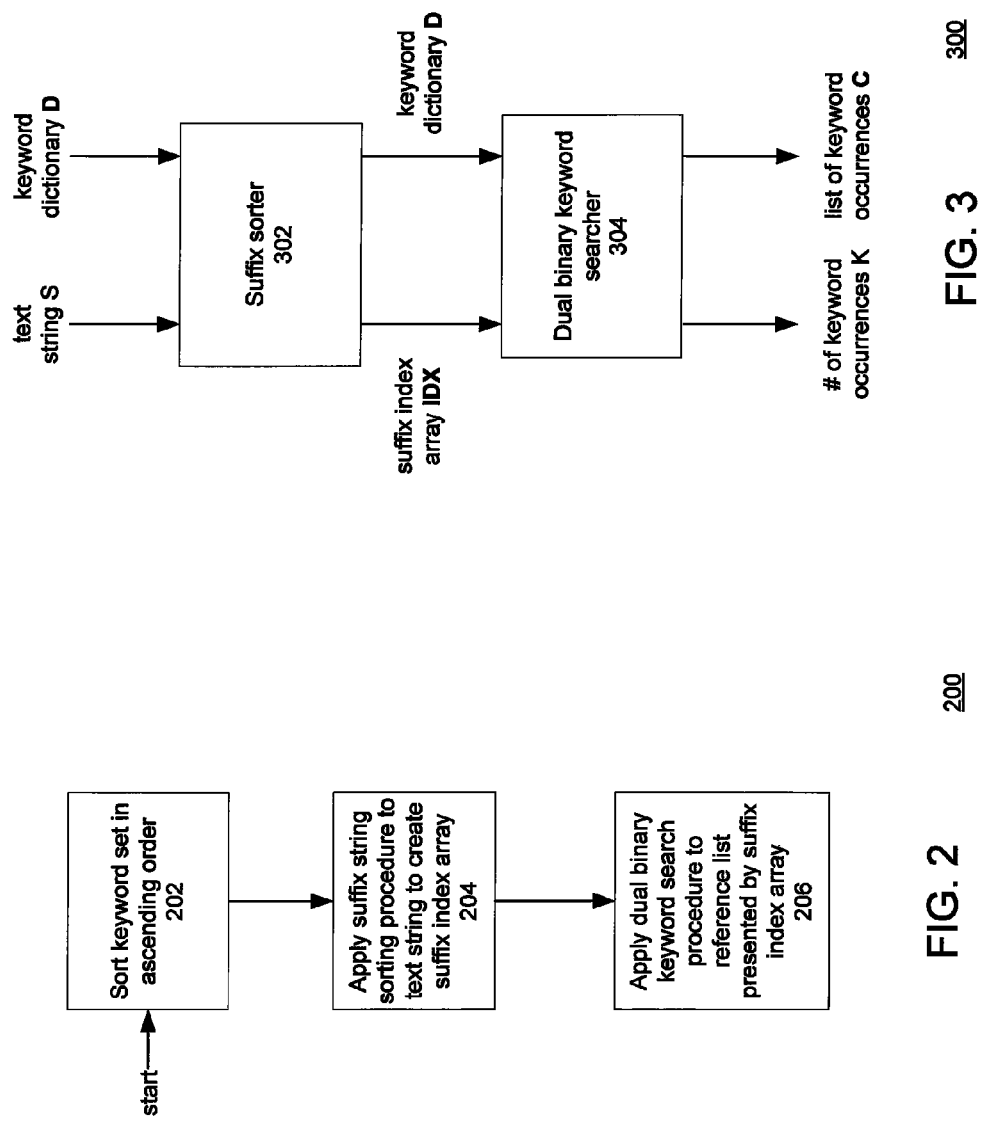

EFFICIENT MULTIPLE-KEYWORD MATCH TECHNIQUE WITH LARGE DICTIONARIES

BACKGROUND OF THE INVENTION

1. Field of the Invention

The present invention relates generally to methods and apparatus for keyword matching. The technology disclosed herein may be applicable in various fields, including data leakage prevention, spam filtering, search engines, anti-plagiarism, data de-duplication, and other text processing applications.

2. Description of the Background Art

Keyword searching is an important technology in various fields that utilize text processing. Such fields include, for example, data leakage prevention, spam filtering, search engines, anti-plagiarism, data de-duplication, and other text processing applications.

It is highly desirable to improve the efficiency and accuracy of keyword searching technologies.

SUMMARY

One embodiment relates to a computer-implemented method for multiple-keyword matching performed using a computer including at least a processor, data storage, and computer-readable instructions. A keyword set and a text string to be searched are obtained. A suffix sorting procedure is applied to the text string to create a suffix index array. A dual binary keyword search procedure is applied to a reference list of suffix strings presented by the suffix index array.

The dual binary keyword search procedure may apply a recursive function that utilizes a divide-and-conquer process and may have inputs of a results list, the suffix index array, and the keyword set. The divide-and-conquer process applies not only to the suffix index array but also to the sorted keyword set. This is why it is called dual binary search. The recursive function may add a range of items to the results list if a keyword is determined to be a prefix of a suffix string in the reference list.

Another embodiment relates to a computer apparatus configured to perform multiple-keyword matching. The apparatus includes data storage configured to store computer-readable instruction code and data, and a processor configured to access the data storage and to execute said computer-readable instruction code. Computer-readable instruction code is configured to obtain a keyword set and a text string to be searched, apply a suffix string sorting procedure to the text string to create a suffix index array, and apply a dual binary keyword search procedure to a reference list of suffix strings presented by the suffix index array.

These and other embodiments and features of the present invention will be readily apparent to persons of ordinary skill in the art upon reading the entirety of this disclosure, which includes the accompanying drawings and claims.

BRIEF DESCRIPTION OF THE DRAWINGS

FIG. 2 is a flow chart of a computer-implemented method for multiple-keyword matching with a large dictionary in accordance with an embodiment of the invention.

FIG. 3 is a block diagram of a computer-implemented apparatus for multiple-keyword matching with a large dictionary in accordance with an embodiment of the invention.

DETAILED DESCRIPTION

Computer Apparatus

Figure 1:
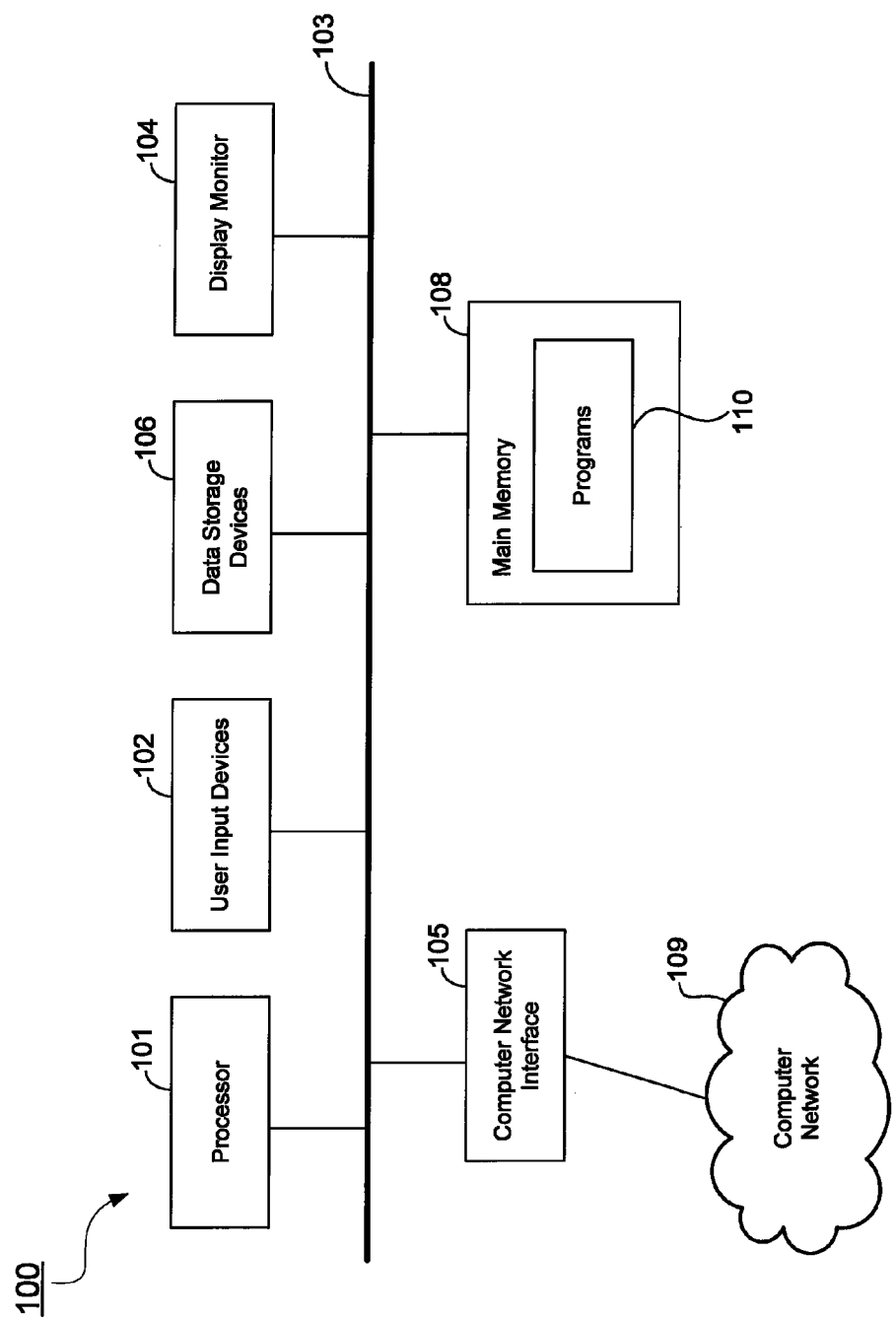
FIG. 1 is a schematic diagram of an example computer that may be used in embodiments of the present invention.

Referring to FIG. 1, there is shown a schematic diagram of an example computer apparatus that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In particular, the main memory 108 may loaded with programs 110 (comprising computer-readable instruction code and data) which may be executed by the processor 101 to perform some of the functionalities and operations as described herein.

Problem Addressed by the Present Disclosure

Keyword searching is an important technology in various fields that utilize text processing. Such fields include, for example, data leakage prevention, spam filtering, search engines, anti-plagiarism, data de-duplication, and other text processing applications. In these fields, it is sometimes desired to search a text file to check for the presence of multiple keywords. Multiple-keyword matching is a substantially more challenging task than single-keyword matching.

For example, multiple-keyword matching may require matching a text file against a very large dictionary of keywords. The size of the dictionary may be, for example, of the scale of thousands or millions of keywords. Performing this keyword matching with a large dictionary in a reasonable amount of time is a very challenging task, even with the processing speed of today's computer systems.

Difficulties and Disadvantages of Previous Solutions

One previous solution for multiple-keyword matching uses a Boyer-Moore-Horspool (BMH) procedure iteratively. The BMH procedure is an efficient procedure for single-keyword matching. However, applicants believe that the BMH algorithm scales poorly to matching multiple keywords.

Another previous solution for multiple-keyword matching is to extend a Karp-Rabin (KR) procedure to matching multiple keywords. KR was originally designed for single-keyword matching and uses a hash function to match keywords in a given text. However, applicants believe that the KR procedure also scales poorly to matching multiple keywords when at least one of the keywords is relatively short (for example, less than 5 bytes long).

Suffix Array Dual Binary Search

The present application discloses a novel and innovative procedure which successfully matches multiple keywords, including short keywords, with a large dictionary in a highly scalable manner. The applicants have named this new procedure as the suffix array dual binary search (SADBS) procedure. In accordance with an embodiment of the invention, a computer-based implementation of the SADBS procedure is depicted in the flow chart of FIG. 2 and the block diagram of FIG. 3.

The following is a statement of the problem solved by the SADBS procedure. It is a general problem to search a given text file to match multiple keywords. Assume that we have a keyword dictionary D having M keywords $KW_1$ to $KW_M$, i.e. $D=\{KW_1, KW_2, \ldots, KW_M\}$. Further assume that we are given a text string S having the N characters $t_1, t_2, \ldots, t_N$ in series, i.e. $S=t_1 t_2 \ldots t_N$. The problem is to find and locate all occurrences of keywords from the dictionary D in the text string S.

Note that, without loss of generality, it may be assumed that all the keywords $K_i$ are case sensitive. For keywords with case insensitivity, a similar procedure may be constructed.

Method steps of the SADBS procedure may be summarized as follows. These steps are illustrated in the flow chart of FIG. 2.

First, the keyword set D may be sorted 202 in ascending order. Here, we still denote the new list as D without loss of generality. In one embodiment, this sorting step may be performed as a pre-processing step.

Second, a suffix string sorting procedure is applied 204 to the text string S to create a suffix index array IDX={IDX[1], IDX[2], IDX[N]}. This array IDX presents the array of suffix strings of S in ascending order. IDX[i] presents the i-th suffix string, which is R[i]=S[IDX[i]] S[IDX[i]+1] ... S[N] in the sorted list, where S[i]=t, the number IDX[i] is the offset of this i-th suffix string, and the suffix strings for reference list R={R[1], R[2] ..., R[N]}. This data structure using an index array saves memory and is a very efficient way to present all suffix strings of S.

As depicted in FIG. 3, a computer-implemented suffix sorter 302 may be configured to receive the text string S and the ordered keyword dictionary D. After performing a suffix sorting technique, the suffix sorter 302 outputs the suffix index array IDX.

Third, a particularly-modified version of a dual binary search procedure is applied 206 to the reference list R presented by the suffix index array IDX and the target list which in this case is D. For any keyword kw in the target list, instead of searching for exact matches in the reference list, this procedure searches for a suffix string ss from the reference list R such that kw is a prefix string of ss. The applicants have named this new procedure as a dual binary keyword search (DBKS) procedure. The DBKS procedure is described further below.

As depicted in FIG. 3, a computer-implemented dual binary keyword searcher 304 may be configured to receive the suffix index array IDX and the target list which is the ordered keyword dictionary D. After performing the dual binary keyword search, the dual binary keyword searcher 304 outputs the number K of keyword occurrences matched and the list B of keyword occurrences, each occurrence including both the keyword and its offset position in the string S.

Note that a suffix string of a string $S=t_1 t_2 \ldots t_N$ is a substring of S of the form $t_{N-k+1} t_{N-k+2} t_{N-k+3} \ldots t_N$, where k is a number from 1 to N. Hence, the string S has N suffix strings. Note also that there are conventional techniques for suffix string sorting which are known in the academic literature. Such techniques may sort a set of N suffix strings in ascending order, for example. Finally, note that, for the purposes of this disclosure, we assume that no keyword is a prefix of another keyword in the reference list R of suffix strings. This is a practical assumption.

As discussed above, the suffix array dual binary search (SADBS) procedure may utilize the dual binary keyword search (DBKS) procedure. The DBKS procedure is a specially-modified version of a dual binary search procedure. The dual binary search (DBS) procedure is an innovative search procedure which has been previously developed by the applicants. The following describes first the DBS procedure and then the DBKS procedure.

Dual Binary Search Procedure

The dual binary search (DBS) procedure is a solution to a multiple value binary search (MVBS) problem. The MVBS problem is as follows. Assume that one has an array of sorted items R[1, ..., N] named as a reference list, and an array of sorted items T[1, ..., M] named as a target list, both in strictly ascending order, one needs to find all items of target list T[1, ..., M] from the reference list R[1, ..., N]. The results may be stored into a list A[1, ..., K].

The DBS procedure performs dual binary searching with respect to both the target list and the reference list. Hence, this solution may also be referred to as a multi-value dual binary search.

In one implementation, the DBS procedure starts with an empty list A. The step performed is K=DBS-SEARCH(A, R[1, ..., N], T[1, ..., M]), and the output is K and A[1, ..., K]. The following function DBS-SEARCH is a recursive function which returns the total number of matched items (in the value for K) and the list of items of T[1, ..., M] in R[1, ..., N] (in the list A[1, ..., K]). The following provides prototypical logic in pseudo-code for DBS-SEARCH. Comment lines are preceded by ##.

```
DBS-SEARCH(A,R[L1,...,H1], T[L2,...,H2] )
BEGIN
   IF L2>H2 THEN RETURN 0
   ## We take truncated value for the following value
   M2 = (L2 + H2)/2
   L=L1
   H=H1
   WHILE (L≤H ) DO
      BEGIN
         ## We take truncated value for the following value
         M1=(L+H)/2
         IF T[M2]>R[M1] THEN L=M1+1
         ELSE IF T[M2]<R[M1] THEN H=M1-1
         ELSE
            BEGIN
               ADD T[M2] TO A
               V=1+DBS-SEARCH(A,R[L1,...,M1-1], T[L2,...,M2-1])
               V=V+ DBS-SEARCH(A,R[M1+1,...,H1], T[M2+1,...,H2])
               RETURN V
            END ELSE
      END WHILE
   V=DBS-SEARCH(A,R[L1,...,H], T[L2,...,M2-1])
   V=V+ DBS-SEARCH(A,R[L,...,H1], T[M2+1,...,H2])
   RETURN V
END DBS-SEARCH
```

Dual Binary Keyword Search Procedure

The dual binary keyword search (DBKS) procedure is a specially-modified version of the dual binary search (DBS) procedure. The modification takes special consideration of characteristics of multiple keyword searching performed on an array of suffix strings.

For the DBKS procedure, the inputs may be as follows: a reference list R[1, ..., N] of suffix strings in strictly ascending order; a target list T[1, ..., M] of keywords in strictly ascending order, and an empty list C (for the results). Per the SADBS procedure described above, the reference list R[1, . . . , N] may correspond to the reference list R presented by the suffix index array IDX, and the target list T[1, . . . , M] may correspond to the ordered keyword dictionary D.

The reference list may be presented by the suffix index array IDX[1, . . . , N]. In other words, R[1, . . . , N] may be obtained or derived from IDX[1, . . . , N] given the text string S[1, . . . , N]. In particular, R[i]=S[IDX[i]]S[IDX[i]+1] . . . S[N]. Note that the following prototypical logic in pseudo-code makes reference to R[1, . . . , N] instead of IDX[1, . . . , N] to simplify the presentation of the logic.

In one implementation, the DBKS procedure starts with an empty list C. The step performed is K=DBKS(C, R[1, . . . , N], T[1, . . . , M]), and the output is K and C[1, . . . , K]. The following function DBKS is a recursive function which returns the total number of matched items (in the value for K) and the list of items of T[1, . . . , M] in R[1, . . . , N] (in the list C[1, . . . , K]). The following provides prototypical logic in pseudo-code for DBKS. Comment lines are preceded by ##.

```
DBKS(C, R[L1, . . . , H1], T[L2, . . . , H2])
BEGIN
IF L1>H1 OR L2>H2 THEN
   RETURN 0
ENDIF
M2=(L2+H2)/2
L=L1
H=H1
WHILE (L≤H) DO
   M1=(L+H)/2
   IF T[M2]>R[M1] THEN
      L=M1+1
   ELSE IF (T[M2] IS NOT a Prefix of R[M1]) THEN
      H=M1-1
   ELSE
This means that T[M2] is a prefix of R[M1]. There are possible multiple items in the
neighborhood of R[M1] in the reference list R that each of them has T[M2] as its prefix.
It is easy to identify the two numbers B and E such that R[M1-B], R[M1-B+1], . . . , R[M1-1],
R[M1], R[M1+1], . . . , R[M1+E-1], R[M1+E] all have T[M2] as its prefix.
Determine B and E that all items in R between R[M1-B] and R[M1+E] have T[M2] as prefix.
ADD the pairs <T[M2], IDX[M1-B]>, . . . , <T[M2], IDX[M1+E]> TO C
V=B+E+1+DBKS(C, R[L1, . . . , M1-B-1], T[L2, . . . , M2-1])
   +DBKS(C, R[M1+E+1, . . . , H1], T[M2+1, . . . , H2])
RETURN V
   ENDIF
   END WHILE
   V=DBKS(C, R[L1, . . . , H], T[L2, . . . , M2-1])
   +DBKS(C, R[L, . . . , H1], T[M2+1, . . . , H2])
   RETURN V
END DBKS
```

The recursive function DBKS( ) described by the above pseudo-code utilizes a divide-and-conquer process and has inputs of a results list, the suffix index array, and the keyword set. The recursive function determines if a keyword is a prefix of a suffix string in the reference list. If the keyword is determined to be a prefix of a suffix string in the reference list, then one or more items are added to the results list. In determining the items to be added, a neighboring range of suffix strings in the reference list is found, where the suffix strings in the neighboring range have the keyword as a prefix. One item may be added to the results list for each suffix string in the neighboring range. Each item may include the keyword and the location in the text string of the start of the matching suffix string.

Performance Results

Applicants have determined that the above-described SADBS procedure provides superior performance when the keyword dictionary is large while the keyword length may be short. In particular, a large keyword dictionary may have 10,000 keywords or more, and the dictionary may include short keywords which are three or four bytes long. For example, the keyword dictionary may include several thousand names and may include short names that are a few bytes in length.

Table 1 below compares, for various numbers of keywords in an example dictionary, the performance of the SADBS procedure against the performance of the BMH procedure. The performance is shown in terms of the number of seconds (s) to finish the matching procedure. In this comparison, the text string that was searched for keywords is 15 megabytes in length.

TABLE 1

| # keywords | 1 | 50 | 500 | 5000 | 50,000 | 500,000 | 1,000,000 |
|---|---|---|---|---|---|---|---|
| BMH | 0 s | 1 s | 13 s | 137 s | 1379 s | Did not finish | Did not finish |
| SADBS | 9 s | 9 s | 9 s | 9 s | 9 s | 10 s | 11 s |

In Table 1, "Did not finish" means that the procedure took too long a time such that the match procedure was not finished. As seen above, while the BMH procedure finishes rapidly for small dictionaries, it does not scale well and takes a proportionally longer time to finish as the dictionary gets larger. In comparison, the SADBS procedure finishes in a similar amount of time regardless of the dictionary size. In other words, the SADBS procedure scales very well with the dictionary size.

What is claimed is:

1. A computer-implemented method for multiple-keyword matching performed using a computer including at least a processor, data storage, and computer-readable instructions, and the computer-implemented method comprising:
   obtaining a keyword set;
   obtaining a text string to be searched;
   applying a suffix string sorting procedure to the text string to create a suffix index array; and
   applying a dual binary keyword search procedure using a recursive function to a reference list of suffix strings presented by the suffix index array,
   wherein the recursive function utilizes a divide-and-conquer process and has inputs of a results list, the suffix index array, and the keyword set, determines if a keyword is a prefix of a suffix string in the reference list, and adds items to the results list if the keyword is determined to be a prefix of a suffix string in the reference list.

2. The computer-implemented method of claim 1, further comprising:
   sorting the keyword set in ascending order prior to applying the suffix string sorting procedure.

3. The computer-implemented method of claim 1, wherein the keyword set includes at least five hundred keywords.

4. The computer-implemented method of claim 3, wherein the keyword set includes a plurality of keywords with less than five characters.

5. The computer-implemented method of claim 1, further comprising:
   determining the items to be added by finding a range of suffix strings in the reference list which have the keyword as a prefix.

6. The computer-implemented method of claim 1, wherein the dual binary keyword search procedure returns a total number of matched keywords and a list of keyword occurrences.

7. A computer apparatus configured to perform multiple-keyword matching, the computer apparatus comprising:
   data storage configured to store computer-readable instruction code and data;
   a processor configured to access the data storage and to execute said computer-readable instruction code;
   computer-readable instruction code configured to obtain a keyword set and a text string to be searched, apply a suffix string sorting procedure to the text string to create a suffix index array, and apply a dual binary keyword search procedure using a recursive function to a reference list of suffix strings presented by the suffix index array,
   wherein the recursive function utilizes a divide-and-conquer process and has inputs of a results list, the suffix index array, and the keyword set, determines if a keyword is a prefix of a suffix string in the reference list, and adds items to the results list if the keyword is determined to be a prefix of a suffix string in the reference list.

8. The computer apparatus of claim 7, further comprising:
   computer-readable instruction code configured to sort the keyword set in ascending order prior to applying the suffix string sorting procedure.

9. The computer apparatus of claim 7, wherein the keyword set includes at least five hundred keywords.

10. The computer apparatus of claim 9, wherein the keyword set includes a plurality of keywords with less than five characters.

11. The computer apparatus of claim 7, further comprising:
    computer-readable instruction code configured to determine the items to be added by finding a range of suffix strings in the reference list which have the keyword as a prefix.

12. The computer apparatus of claim 7, wherein the dual binary keyword search procedure returns a total number of matched keywords and a list of keyword occurrences.

* * * * *